US008811950B2

(12) United States Patent
Li et al.

(10) Patent No.: US 8,811,950 B2
(45) Date of Patent: Aug. 19, 2014

(54) METHODS AND APPARATUS FOR CONTROLLING DEVICES WITH NO OR LIMITED WWAN CAPABILITY IN PEER TO PEER COMMUNICATION

(75) Inventors: Junyi Li, Chester, NJ (US); Hua Wang, Bridgewater, NJ (US); Shailesh Patil, Bridgewater, NJ (US)

(73) Assignee: QUALCOMM Incorporated, San Diego, CA (US)

(*) Notice: Subject to any disclaimer, the term of this patent is extended or adjusted under 35 U.S.C. 154(b) by 301 days.

(21) Appl. No.: 13/436,264

(22) Filed: Mar. 30, 2012

(65) Prior Publication Data

US 2013/0260812 A1 Oct. 3, 2013

(51) Int. Cl.
*H04M 1/66* (2006.01)
(52) U.S. Cl.
USPC ........... 455/411; 455/410; 455/420; 709/225; 370/261
(58) Field of Classification Search
CPC ... H04W 12/06; H04W 76/023; H04W 84/18; H04W 28/18; H04W 36/0083
USPC ......... 455/411, 410, 420, 414.1, 68; 709/225, 709/203, 206; 370/261, 260
See application file for complete search history.

(56) References Cited

U.S. PATENT DOCUMENTS

| | | | |
|---|---|---|---|
| 7,203,871 B2 * | 4/2007 | Turner et al. | 714/710 |
| 7,206,841 B2 * | 4/2007 | Traversat et al. | 709/225 |
| 7,233,792 B2 * | 6/2007 | Chang | 455/422.1 |
| 7,254,608 B2 * | 8/2007 | Yeager et al. | 709/203 |
| 7,350,074 B2 * | 3/2008 | Gupta et al. | 713/157 |
| 7,466,810 B1 * | 12/2008 | Quon et al. | 379/201.01 |
| 7,475,139 B2 * | 1/2009 | Goodman et al. | 709/225 |
| 7,623,476 B2 * | 11/2009 | Ravikumar et al. | 370/261 |
| 7,734,710 B2 | 6/2010 | Seligmann et al. | |
| 7,783,762 B2 * | 8/2010 | Vincent | 709/227 |
| 7,797,375 B2 * | 9/2010 | Vincent | 709/203 |
| 7,933,260 B2 * | 4/2011 | Chaturvedi et al. | 370/352 |
| 8,156,223 B2 * | 4/2012 | Teodosiu et al. | 709/225 |

(Continued)

FOREIGN PATENT DOCUMENTS

| | | |
|---|---|---|
| EP | 1569411 A1 | 8/2005 |
| WO | WO-2009138820 A1 | 11/2009 |
| WO | WO-2011020180 A1 | 2/2011 |
| WO | WO-2011147462 A1 | 12/2011 |

OTHER PUBLICATIONS

International Search Report and Written Opinion—PCT/US2013/034450-ISA/EPO-Aug. 28, 2013.

*Primary Examiner* — Minh D Dao
(74) *Attorney, Agent, or Firm* — James K. O'Hare

(57) ABSTRACT

In a wireless wide area network (WWAN) scenario, communication between UEs is facilitated through uplink/downlink channels between the UEs and a base station (i.e., WWAN link or WWAN communication). In the case that two communicating UEs are in the vicinity of each other, direct peer-to-peer communication without passing through the base station may reduce a base station load. In some scenarios, it is beneficial for devices, with no or limited WWAN capability to also participate in peer-to-peer communication. Accordingly, a method, an apparatus, and a computer program product for wireless communication are provided in which control information from a user equipment (UE) is received, the control information including information indicating resources for peer-to-peer communication, a peer-to-peer link with the UE to receive authentication information for using the resources is established, and the resources are used to communicate with a peer device.

28 Claims, 11 Drawing Sheets

(56) References Cited

U.S. PATENT DOCUMENTS

| | | | |
|---|---|---|---|
| 8,332,527 B2 * | 12/2012 | Yan et al. .................... 709/231 |
| 8,516,607 B2 * | 8/2013 | Mao et al. .................... 726/29 |
| 2002/0053032 A1 * | 5/2002 | Dowling et al. ............. 713/201 |
| 2006/0259957 A1 * | 11/2006 | Tam et al. .................... 726/3 |
| 2007/0106892 A1 * | 5/2007 | Engberg ........................ 713/168 |
| 2007/0230423 A1 | 10/2007 | Yoshida et al. |
| 2009/0157829 A1 * | 6/2009 | Choi et al. .................... 709/206 |
| 2009/0292814 A1 * | 11/2009 | Ting et al. .................... 709/229 |
| 2010/0062758 A1 | 3/2010 | Proctor, Jr. et al. |
| 2010/0138552 A1 | 6/2010 | Oh et al. |
| 2010/0165882 A1 | 7/2010 | Palanki et al. |
| 2011/0034127 A1 | 2/2011 | Wentink et al. |
| 2011/0051642 A1 | 3/2011 | Krishnaswamy |
| 2011/0082940 A1 | 4/2011 | Montemurro et al. |
| 2012/0158577 A1 * | 6/2012 | Tam et al. .................... 705/38 |
| 2012/0304313 A1 * | 11/2012 | Mao et al. .................... 726/29 |
| 2013/0067547 A1 * | 3/2013 | Thavasi et al. ............... 726/7 |
| 2013/0160008 A1 * | 6/2013 | Cawlfield et al. ............ 718/1 |
| 2013/0268584 A1 * | 10/2013 | Desai .......................... 709/203 |

* cited by examiner

METHODS AND APPARATUS FOR CONTROLLING DEVICES WITH NO OR LIMITED WWAN CAPABILITY IN PEER TO PEER COMMUNICATION

BACKGROUND

1. Field

The present disclosure relates generally to communication systems, and more particularly, to controlling a device without wireless wide area network (WWAN) capability in peer-to-peer communication.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In a wireless wide area network (WWAN) scenario, communication between mobile terminals is facilitated through uplink/downlink channels between the mobile terminals and a base station (i.e., WWAN link or WWAN communication). In the case that two communicating mobile terminals are in the vicinity of each other, direct peer-to-peer communication without passing through the base station may reduce a base station load. The peer-to-peer communication may depend on synchronization control signals received from the WWAN. Devices, with no or limited WWAN capability may also participate in peer-to-peer communication. Accordingly, in an aspect of the disclosure, a method, an apparatus, and a computer program product for wireless communication are provided in which control information from a user equipment (UE) is received, the control information comprising information indicating resources for peer-to-peer communication, a peer-to-peer link with the UE to receive authentication information for using the resources is established, and the resources are used to communicate with a peer device.

DETAILED DESCRIPTION

Figure 1:
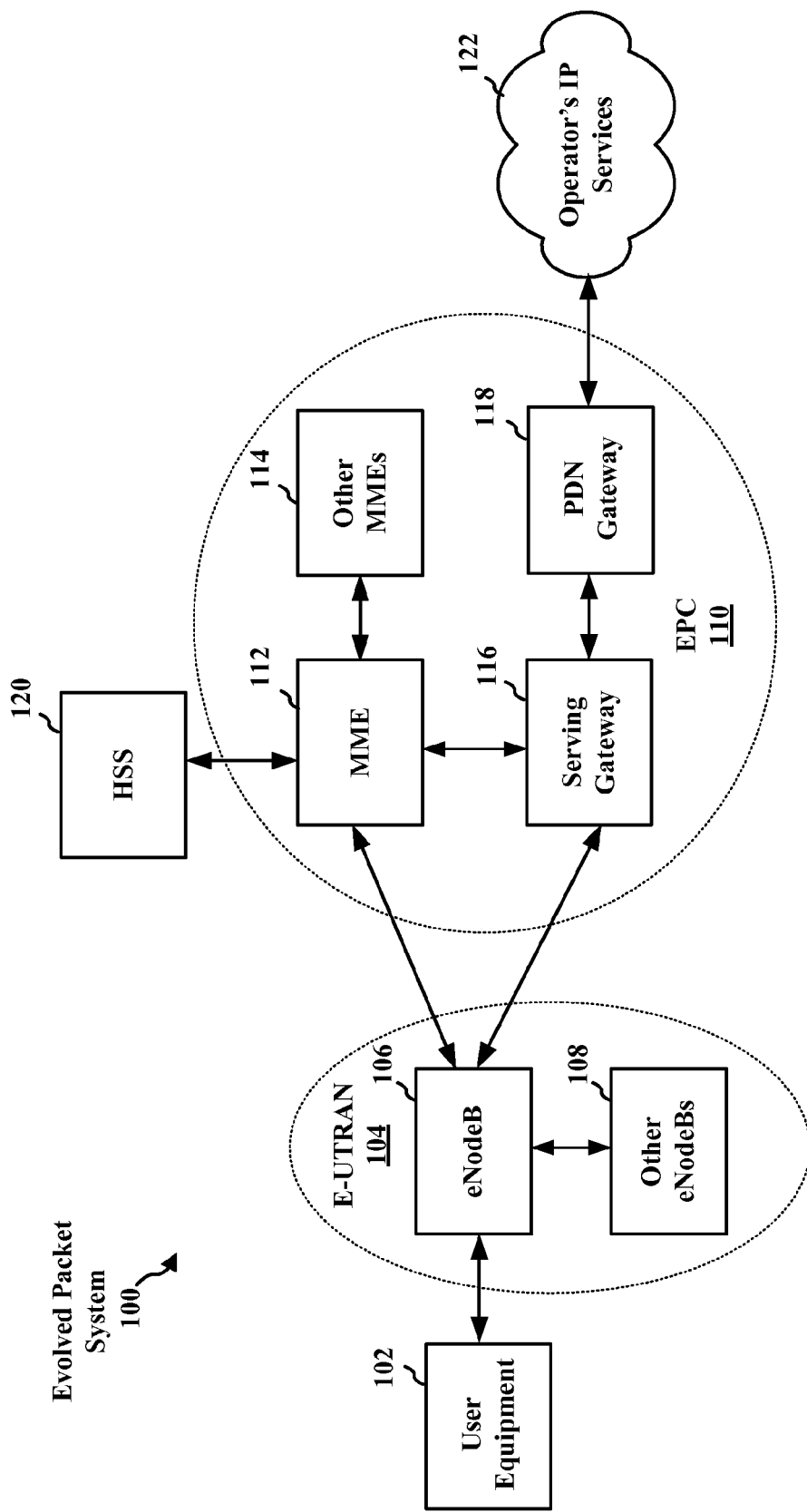
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
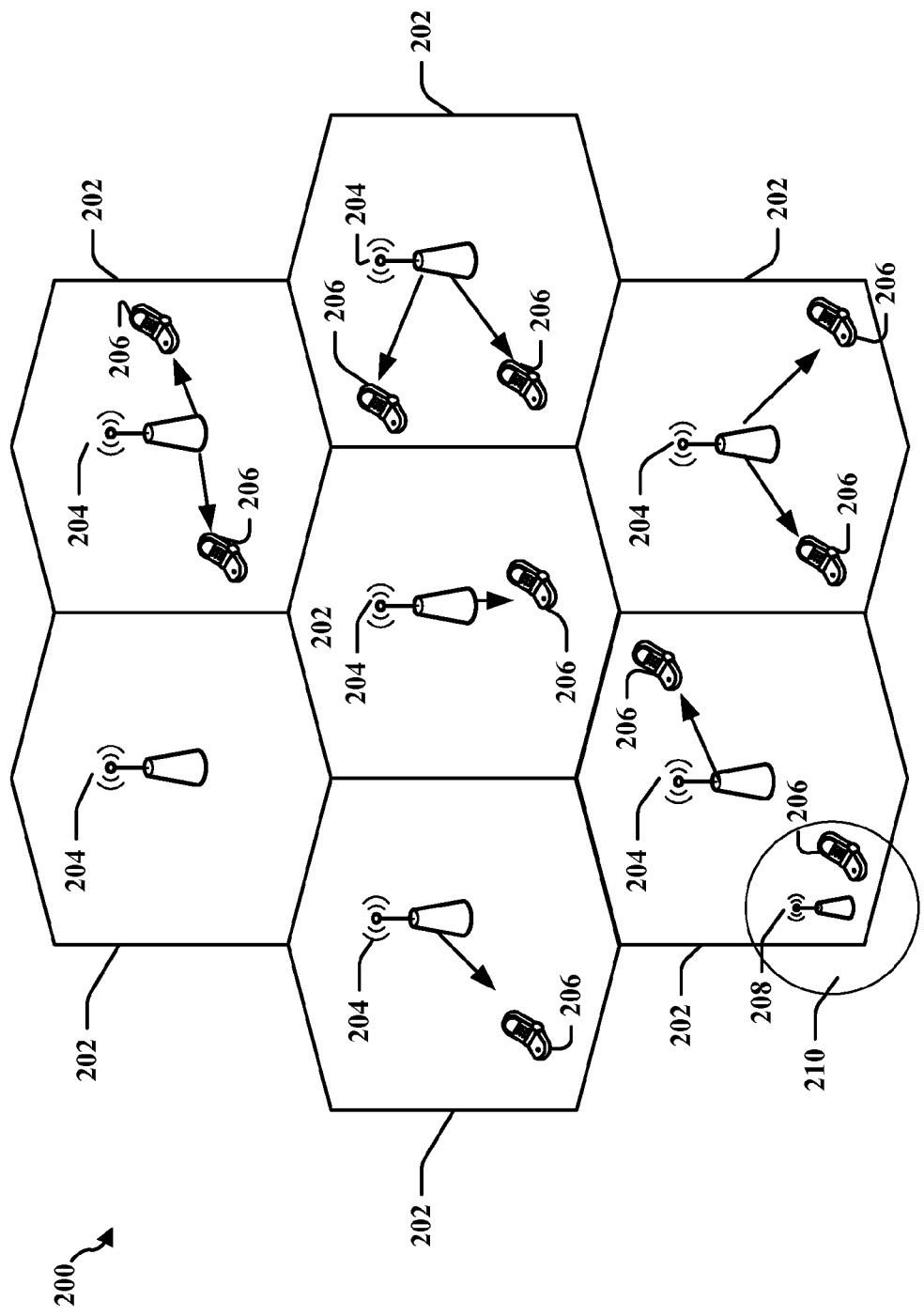
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
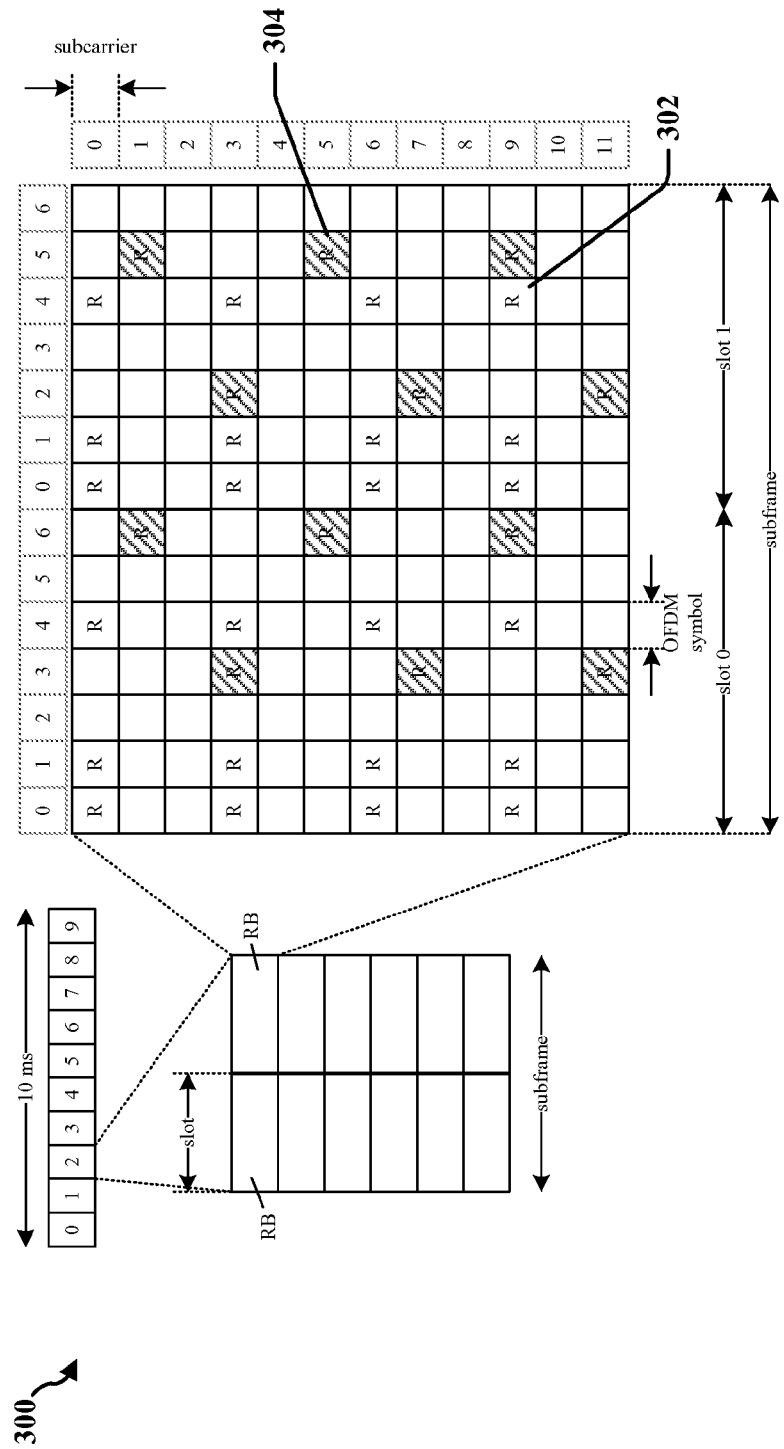
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
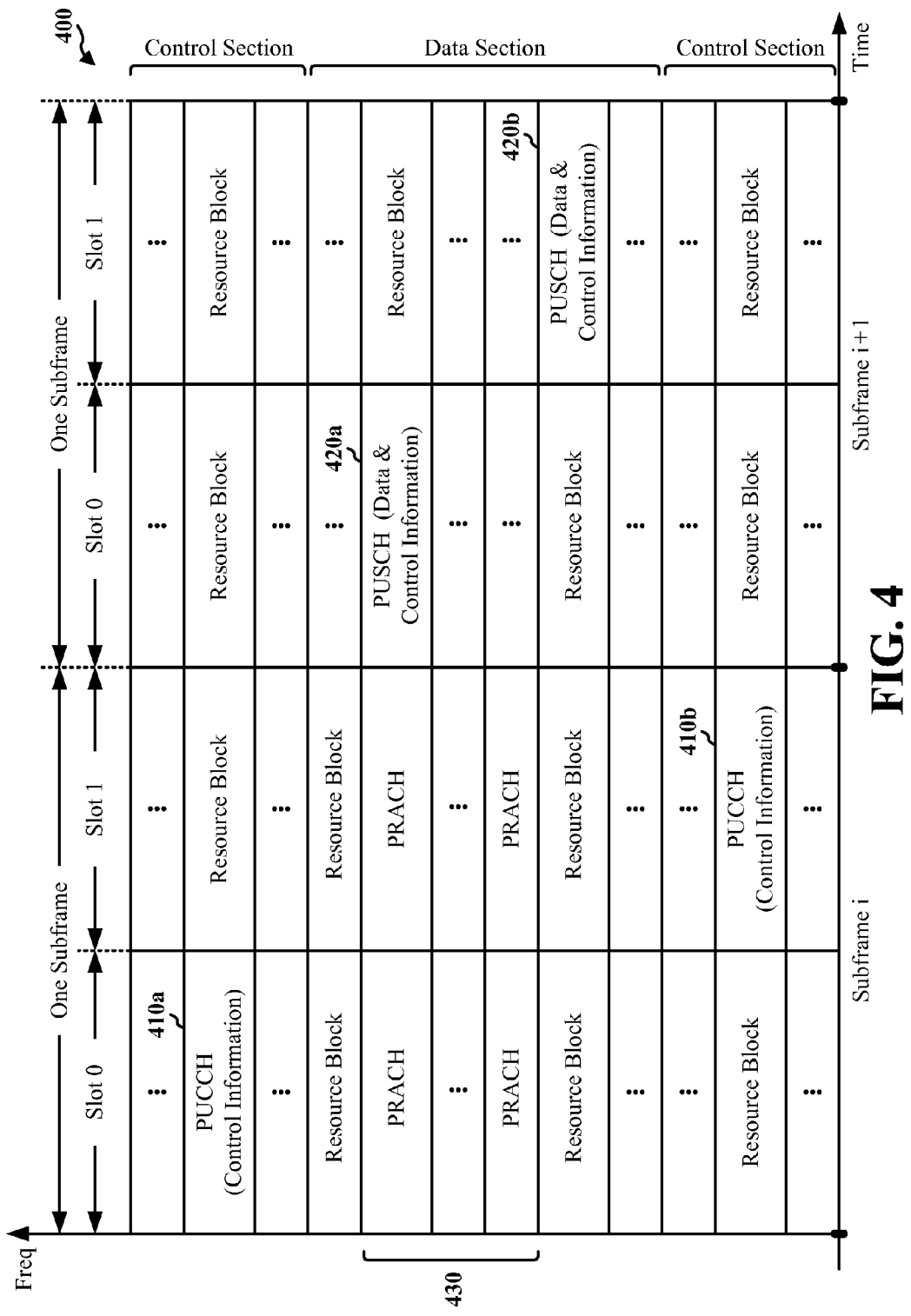
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
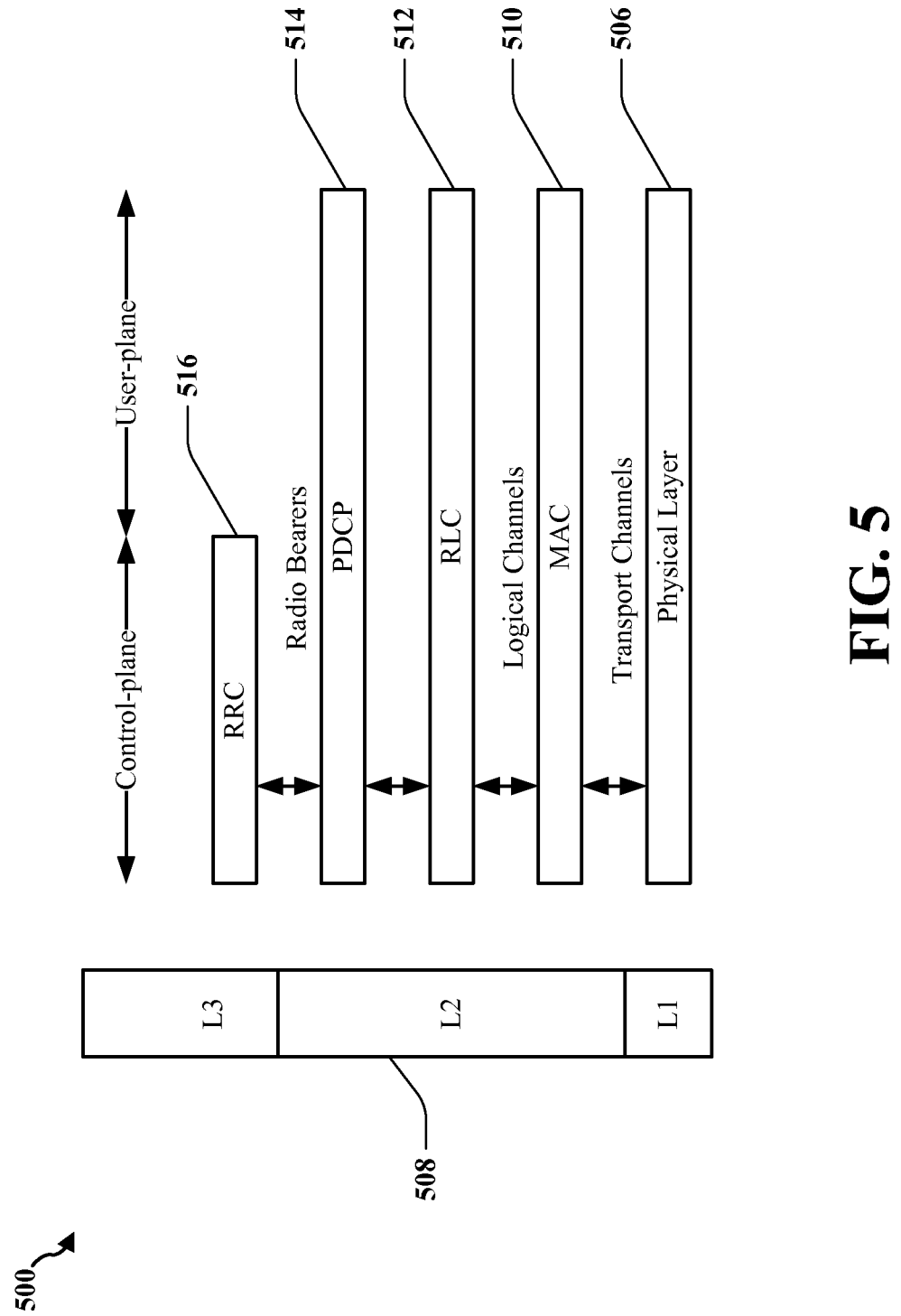
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
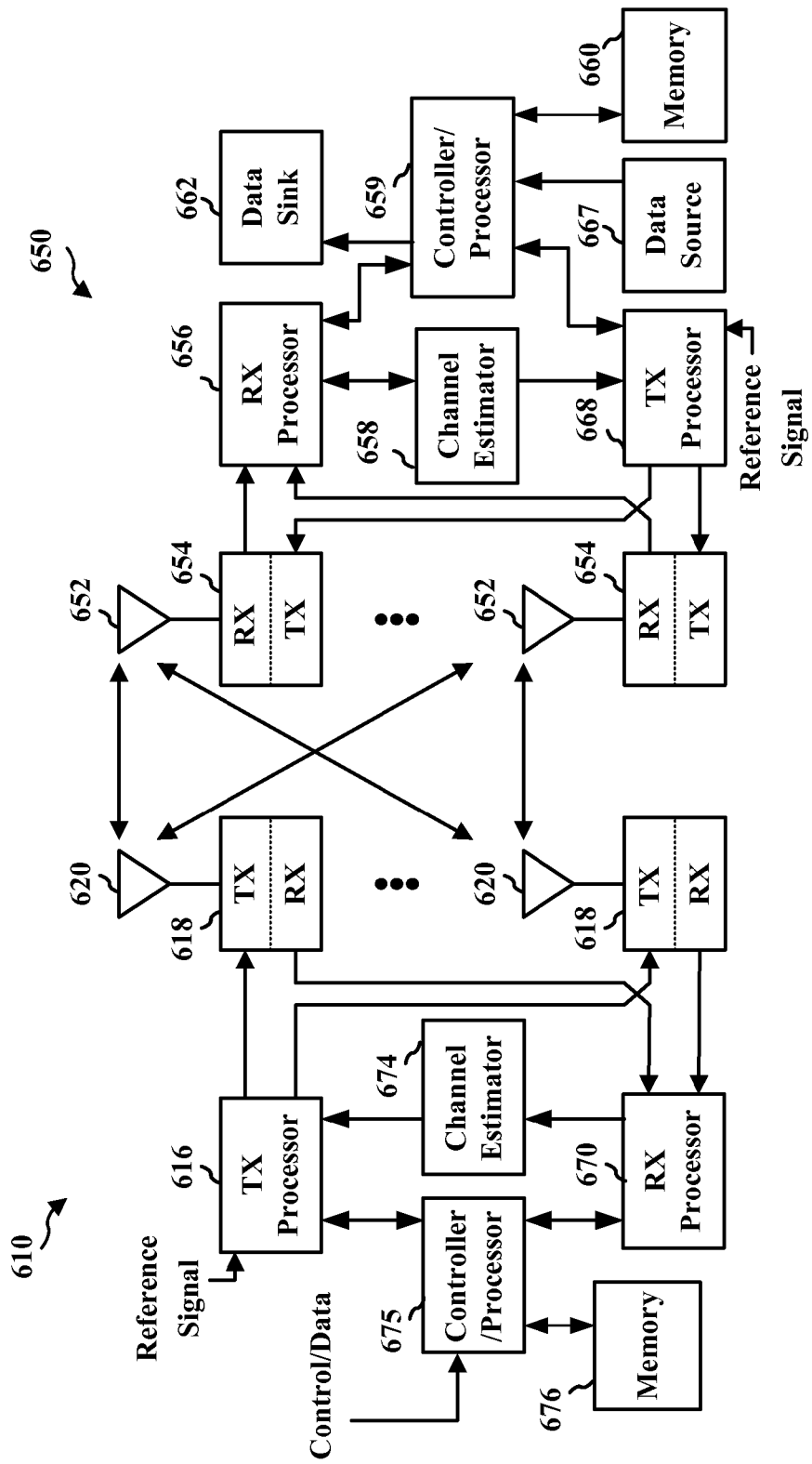
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
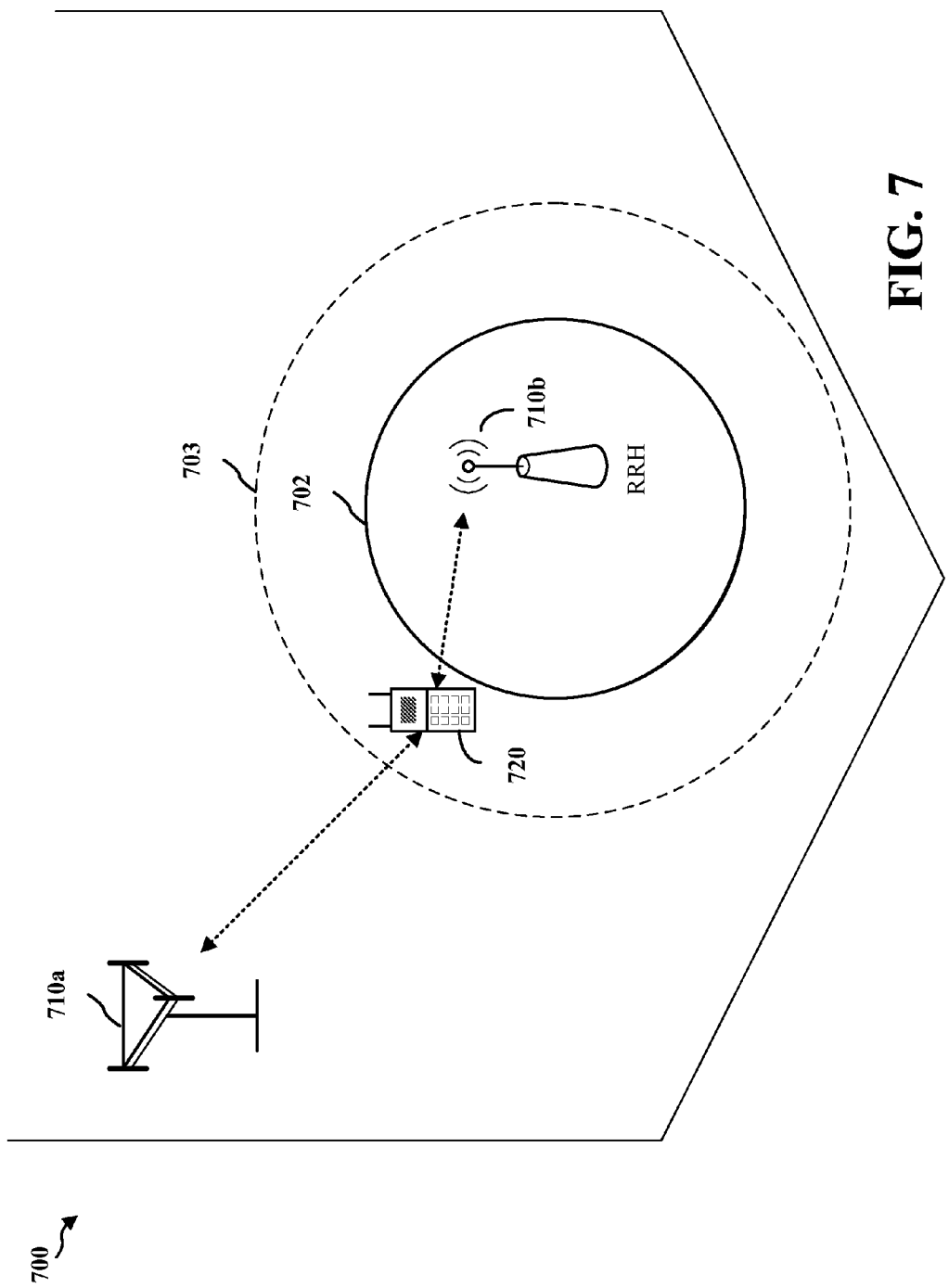
FIG. 7 is a diagram illustrating a range expanded cellular region in a heterogeneous network.

FIG. 7 is a diagram 700 illustrating a range expanded cellular region in a heterogeneous network. A lower power class eNB such as the RRH 710b may have a range expanded cellular region 703 that is expanded from the cellular region 702 through enhanced inter-cell interference coordination between the RRH 710b and the macro eNB 710a and through interference cancelation performed by the UE 720. In enhanced inter-cell interference coordination, the RRH 710b receives information from the macro eNB 710a regarding an interference condition of the UE 720. The information allows the RRH 710b to serve the UE 720 in the range expanded cellular region 703 and to accept a handoff of the UE 720 from the macro eNB 710a as the UE 720 enters the range expanded cellular region 703.

In a wireless wide area network (WWAN) scenario, communication between mobile terminals is facilitated through uplink/downlink channels between the mobile terminals and a base station (i.e., WWAN link or WWAN communication). In the case that two communicating mobile terminals are in the vicinity of each other, direct peer-to-peer communication without passing through the base station may reduce a base station load. The peer-to-peer communication may depend on control signals from the WWAN. For example, the mobile terminals may receive synchronization signals from the WWAN.

In some scenarios, it may be beneficial for devices, with no or limited WWAN capability (hereinafter referred to as "stand-alone devices") to also participate in peer-to-peer communication. For example, when a mobile terminal user desires to print pictures stored in the mobile terminal, it would be convenient to find a stand-alone device, such as a printer, in the mobile terminal's vicinity and directly send the pictures to the printer for printing. Examples of other stand-alone devices include but are not limited to personal computers (PCs), televisions, home appliances, etc. Methods and apparatus for enabling and controlling stand-alone-devices in peer-to-peer communication will be described below.

In the disclosure, WWAN devices, such as mobile terminals, may have established peer-to-peer communication in addition to WWAN communication. The peer-to-peer communication may occur in a dedicated spectrum not used for WWAN communication, or may share the same spectrum as a WWAN communication. In both cases, the WWAN devices learn of the time/frequency resources that the peer-to-peer communication occurs in by receiving control signals from the WWAN.

For a stand-alone device to participate in peer-to-peer communication, the stand-alone device must also learn of the time/frequency resources in which the peer-to-peer communication is to occur. If the stand-alone device is unable to decode control signals from the WWAN indicating the time/frequency resources, the stand-alone device may acquire the information from nearby WWAN devices. Notably, some types of stand-alone devices are capable of decoding timing and system information signals from a WWAN broadcast signal. Moreover, the stand-alone devices may communicate (i.e., transmit/receive) in peer-to-peer time/frequency resources to avoid interference with a WWAN communication.

Figure 8:
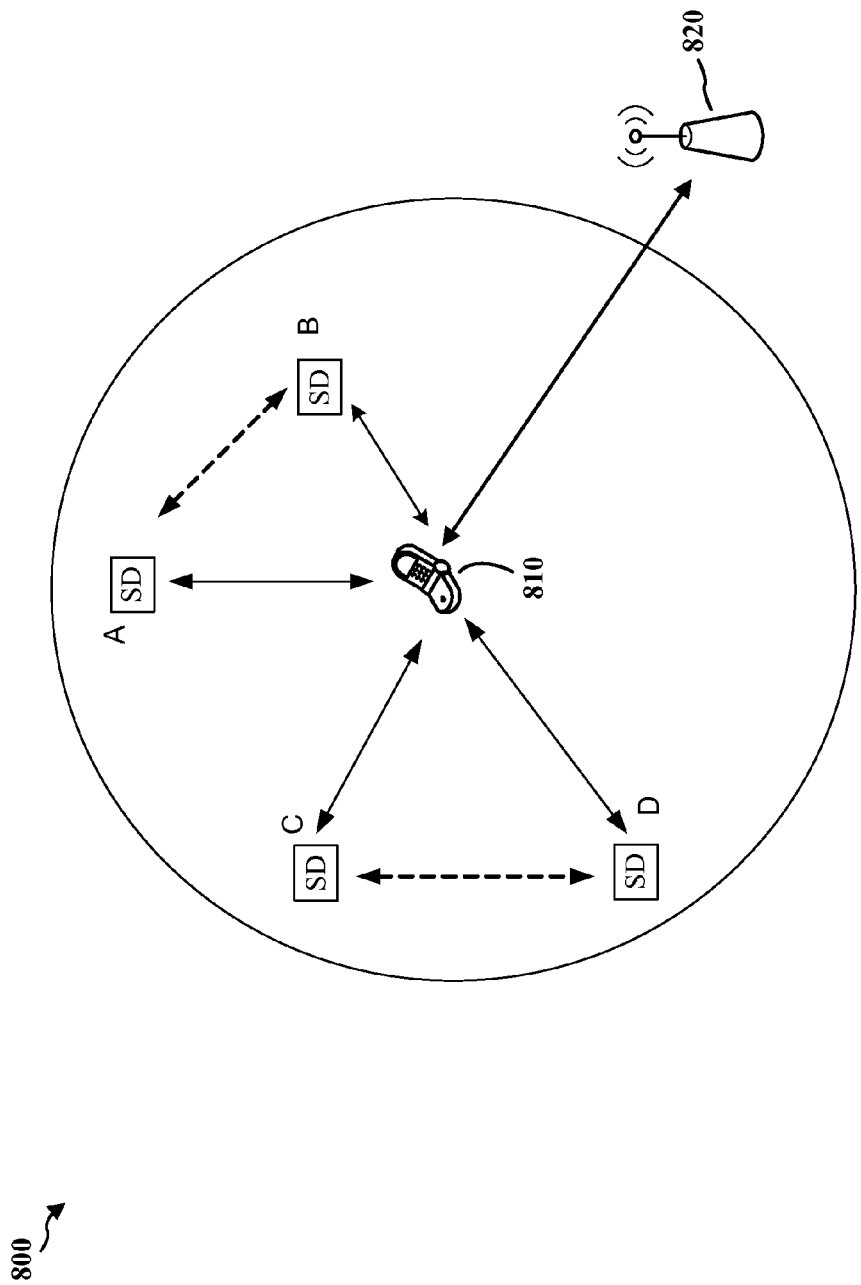
FIG. 8 is a diagram illustrating a WWAN device communicating with stand-alone devices (SDs).

FIG. 8 is a diagram 800 illustrating a WWAN device 810 communicating with stand-alone devices (SDs) A, B, C, and D. As shown in FIG. 8, the WWAN device 810 may have an established WWAN link/WWAN communication with a base station 820. In an aspect, the WWAN device 810 may broadcast control signals (e.g., peer-to-peer timing synchronization signals) and system information signals related to peer-to-peer communication (e.g., time/frequency resources allocated for peer-to-peer communication), which may be received and decoded by a stand-alone device A, B, C, D. Because peer-to-peer communication may take place in multiple bands, the stand-alone devices A, B, C, and D may search through a set of predetermined frequency bands for the peer-to-peer control and system information signals. Depending on the power constraints of the stand-alone device, the stand-alone device may continuously search for the control and system information signals, such as when the stand-alone device has a wired power supply. Otherwise, the stand-alone device may wake from a usual sleep mode and search for a predetermined period of time if the stand-alone device does not have a wired power supply.

When the WWAN device 810 enters into a radio frequency (RF) vicinity of a stand-alone device A, B, C, or D, the stand-alone device may detect and decode a peer-to-peer control signal and system information signal broadcast from the WWAN device 810. Thereafter, the stand-alone device A, B, C, or D may establish a peer-to-peer link with, and be able to receive authentication for using peer-to-peer communication resources from, the WWAN device 810. The stand-alone device A, B, C, or D may then participate in peer-to-peer communication with other devices, including WWAN devices and other stand-alone devices, upon receiving the authentication to use the peer-to-peer communication resources.

For example, as shown in FIG. 8, after the stand-alone devices A and B receive authentication information from the WWAN device 810, the stand-alone devices A and B may participate in peer-to-peer communication with the WWAN device 810, respectively, and also participate in peer-to-peer communication with each other. In another example, as shown in FIG. 8, after the stand-alone devices C and D receive authentication information from the WWAN device 810, the stand-alone devices C and D may participate in peer-to-peer communication with the WWAN device 810, respectively, and also participate in peer-to-peer communication with each other.

Authentication information provides authentication for allowing a stand-alone device to use peer-to-peer communication resources. The authentication information may allow the stand-alone device to use the resources for a period of time. Moreover, the authentication information may allow the stand-alone device to use the resources in the absence of a WWAN device, or only in the presence of the WWAN device. The authentication information may also restrict communication based on a level of the authentication. For example, the authentication information may restrict communication to a set of devices.

In an aspect, the stand-alone device may participate in peer-to-peer communication when it can detect the WWAN device. Here, the stand-alone device continuously contacts the WWAN device to update its authentication information. The stand-alone device may communicate directly with other peer devices or communications to and from the stand-alone device may be relayed through the WWAN device. For example, in an office environment, a user's cell phone may control printers, projectors, fax machines, etc. Accordingly, the cell phone may enable these stand-alone devices to participate in peer-to-peer communication with each other when the cell phone is in the RF vicinity of the devices. The peer-to-peer communication will cease when the cell phone is no longer in the RF vicinity of the devices.

In another aspect, once the stand-alone device updates its authentication information through the WWAN device, the authentication information is valid for a period of time. Thus, the stand-alone device does not need to continually contact the WWAN device for an update. After being authenticated, the stand-alone device may participate in peer-to-peer communication during the period of validity, even when the WWAN device is not in the RF vicinity of the stand-alone device. For example, in a home environment, a user's cell phone may control consumer electronic devices, such as televisions, gaming consoles, digital cameras, etc. Accordingly, the consumer electronic devices may only need to be authenticated through the cell phone once a month. After being authenticated, the consumer electronic devices may participate in peer-to-peer communications even when the cell phone is not in the RF vicinity of the consumer electronic devices.

Figure 9:
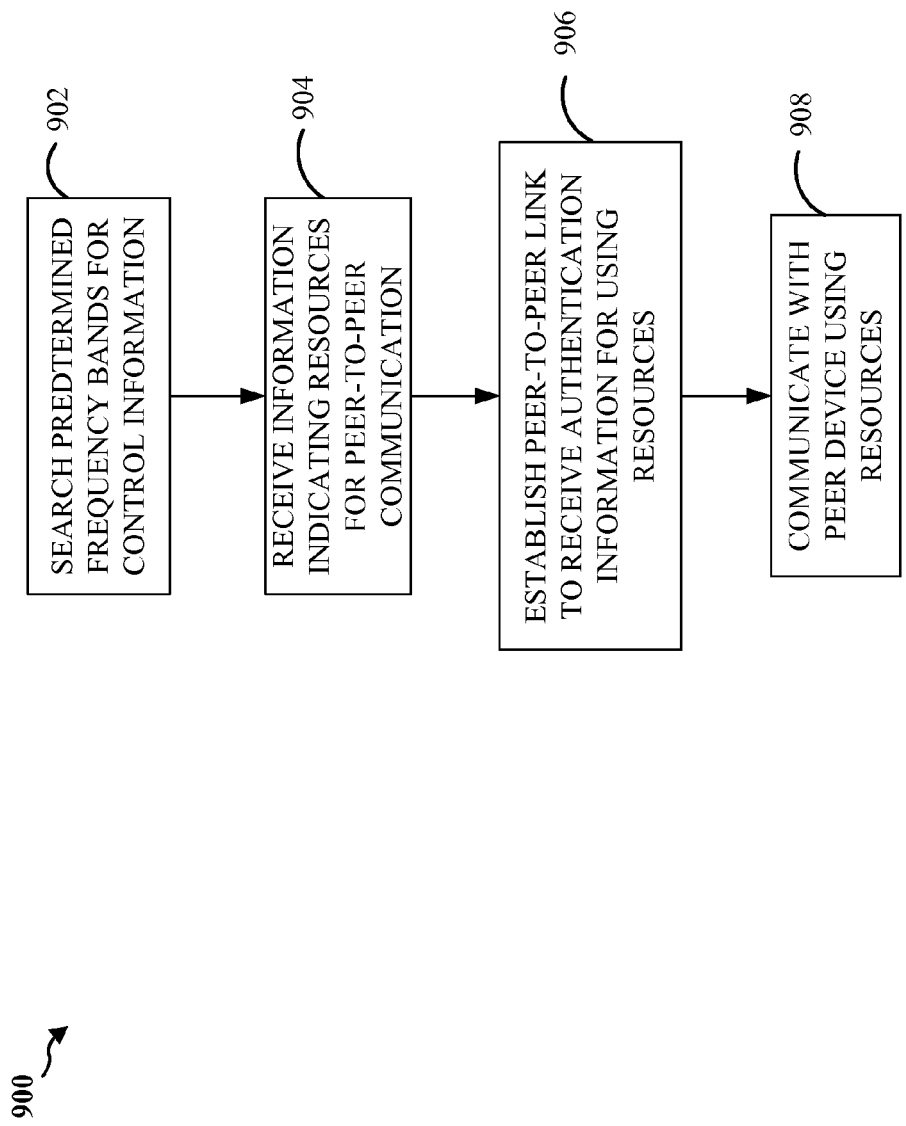
FIG. 9 is a flow chart of a method of wireless communication.

FIG. 9 is a flow chart 900 of a method of wireless communication. The method may be performed by a stand-alone device. At step 902, the stand-alone device searches through predetermined frequency bands for control information. As stated supra, because peer-to-peer communication may occur in multiple frequency bands, the stand-alone device may search through a set of predetermined bands for peer-to-peer control signals and system information signals (e.g., peer-to-peer timing synchronization signals and peer-to-peer time/frequency resources, respectively) broadcast from a WWAN device in an RF vicinity of the stand-alone device. Moreover, depending on the power constraints of the stand-alone device, the stand-alone device may continuously search for the control and system information signals if the stand-alone device has a wired power supply, or may wake from a usual sleep mode and search for a predetermined period of time if the stand-alone device does not have a wired power supply.

At step 904, the stand-alone device receives the control information from a WWAN device, such as a UE. The control information includes information indicating time/frequency resources for participating in peer-to-peer communication. The peer-to-peer communication may be with WWAN devices (UEs) or other stand-alone devices.

At step 906, the stand-alone device establishes a peer-to-peer link with the UE to receive authentication information for using the resources. The authentication information may provide authentication for allowing the stand-alone device to use the peer-to-peer communication resources. The authentication information may also allow the stand-alone device to use the resources for only a period of time. Moreover, the authentication information may allow the stand-alone device to use the resources in the absence of the UE, or only in the presence of the UE. The authentication information may also restrict communication of the stand-alone device based on a level of the authentication. For example, the authentication information may restrict communication to a set of devices.

At step 908, the stand-alone device communicates with a peer device using the resources. Here, the stand-alone device may communicate directly with the peer device. Alternatively, the stand-alone device may communicate with the peer device through the UE.

Figure 10:
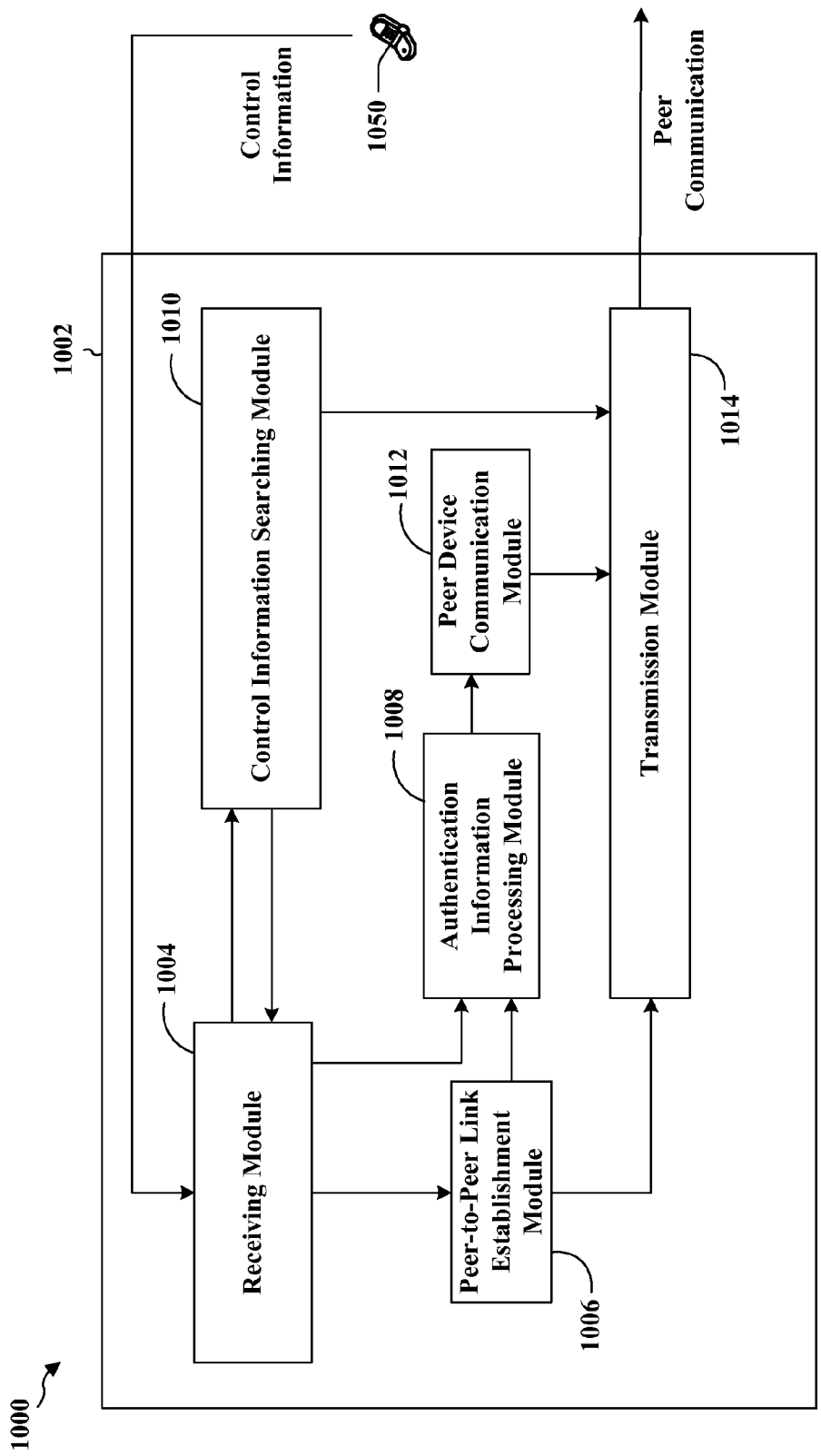
FIG. 10 is a conceptual data flow diagram illustrating the data flow between different modules/means/components in an exemplary apparatus.

FIG. 10 is a conceptual data flow diagram 1000 illustrating the data flow between different modules/means/components in an exemplary apparatus 1002. The apparatus may be a stand-alone device. The apparatus 1002 includes a receiving module 1004, a peer-to-peer establishment module 1006, an authentication information processing module 1008, a control information searching module 1010, a peer device communication module 1012, and a transmission module 1014.

The control information searching module 1010 may search through predetermined frequency bands for control information. Particularly, the control information searching module 1010 may search through a set of predetermined bands for peer-to-peer control signals and system information signals (e.g., peer-to-peer timing synchronization signals and peer-to-peer time/frequency resources, respectively) broadcast from a WWAN device in an RF vicinity of the stand-alone device. Moreover, depending on the power constraints of the stand-alone device, the control information searching module 1010 may continuously search for the control and system information signals if the stand-alone device has a wired power supply, or may intermittently search for a predetermined period of time according to a sleep schedule of the stand-alone device when the stand-alone device does not have a wired power supply.

The receiving module 1004 receives the control information from a WWAN device, such as a UE 1050. The control information includes information indicating resources for participating in peer-to-peer communication. The peer-to-peer communication may be with WWAN devices (UEs) or other stand-alone devices.

The peer-to-peer link establishment module 1006 establishes a peer-to-peer link with the UE 1050, via the transmission module 1014 and receiving module 1004. When the peer-to-peer link is established, the stand-alone device may receive authentication information for using the resources. The authentication information may be received and processed in the authentication information processing module 1008. The authentication information may provide authentication for allowing the authentication information processing module 1008 to use the peer-to-peer communication resources. The authentication information may also allow the authentication information processing module 1008 to use the resources for only a period of time. Moreover, the authentication information may allow the authentication information processing module 1008 to use the resources in the absence of the UE 1050, or only in the presence of the UE 1050. The authentication information may also restrict communication of the stand-alone device based on a level of the authentication. For example, the authentication information may restrict communication to a set of devices.

Based on the authentication information, the peer device communication module 1012 communicates with a peer device, via the transmission module 1014, using the resources. Here, the peer device communication module 1012 may communicate directly with the peer device. Alternatively, the peer device communication module 1012 may communicate with the peer device through the UE 1050.

Figure 11:
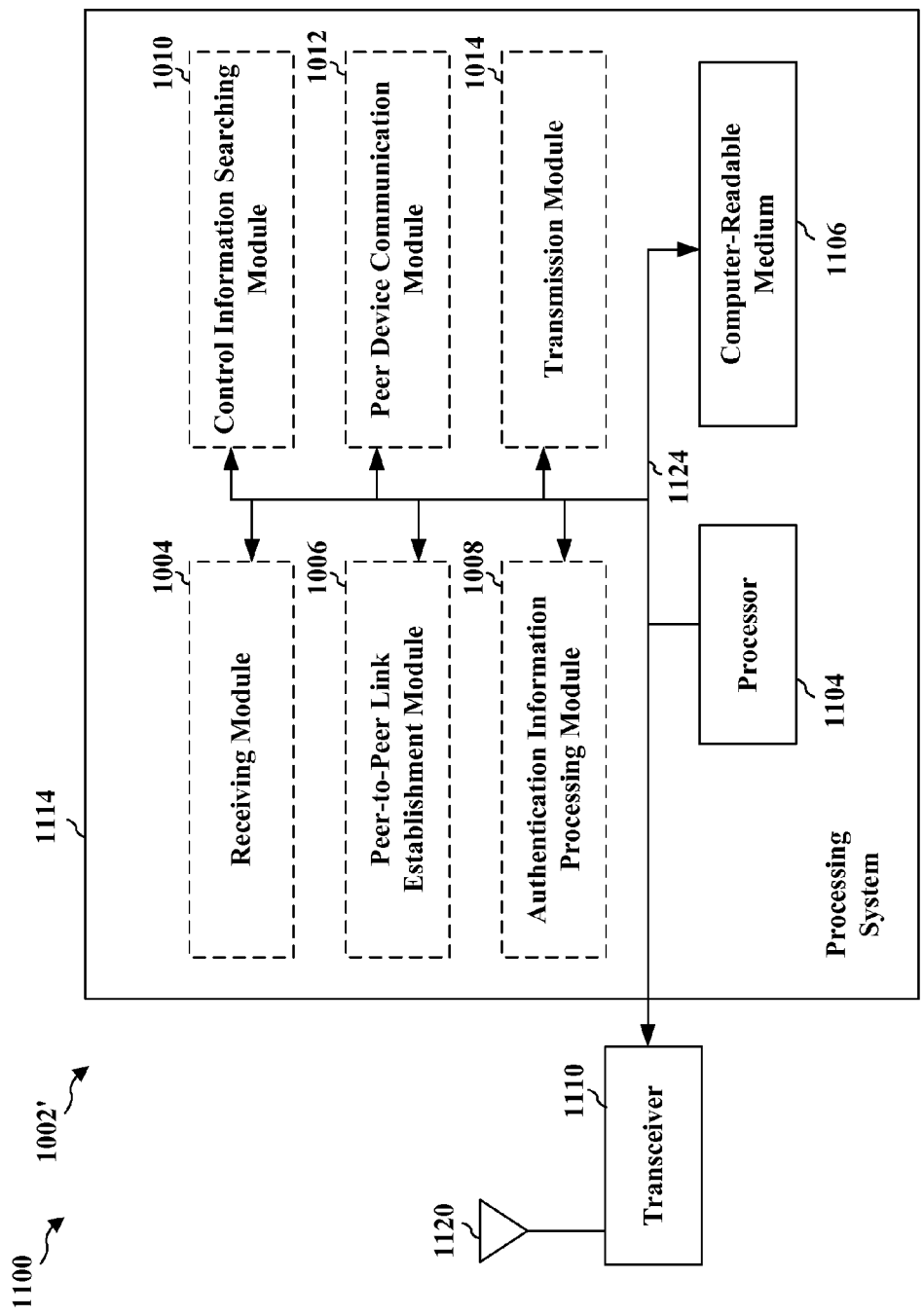
FIG. 11 is a diagram illustrating an example of a hardware implementation for an apparatus employing a processing system.

FIG. 11 is a diagram illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware modules, represented by the processor 1104, the modules 1004, 1006, 1008, 1010, 1012, 1014, and the computer-readable medium 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The processing system 1114 includes a processor 1104 coupled to a computer-readable medium 1106. The processor 1104 is responsible for general processing, including the execution of software stored on the computer-readable medium 1106. The software, when executed by the processor 1104, causes the processing system 1114 to perform the various functions described supra for any particular apparatus. The computer-readable medium 1106 may also be used for storing data that is manipulated by the processor 1104 when executing software. The processing system further includes at least one of the modules 1004, 1006, 1008, 1010, 1012, and 1014. The modules may be software modules running in the processor 1104, resident/stored in the computer readable medium 1106, one or more hardware modules coupled to the processor 1104, or some combination thereof. The processing system 1114 may be a component of the UE 650 and may include the memory 660 and/or at least one of the TX processor 668, the RX processor 656, and the controller/processor 659.

In one configuration, the apparatus 1002/1002' for wireless communication includes means for receiving control information from a user equipment (UE), the control information comprising information indicating resources for peer-to-peer communication, means for establishing a peer-to-peer link with the UE to receive authentication information for using the resources, means for communicating with a peer device using the resources, and means for searching through predetermined frequency bands for the control information. The aforementioned means may be one or more of the aforementioned modules of the apparatus 1002 and/or the processing system 1114 of the apparatus 1002' configured to perform the functions recited by the aforementioned means. As described supra, the processing system 1114 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
   receiving control information from a user equipment (UE), the control information comprising information indicating resources for peer-to-peer communication;
   establishing a peer-to-peer link with the UE to receive authentication information for using the resources, wherein the authentication information provides authentication for using the resources for a period of time absent the presence of the UE; and
   communicating with a peer device using the resources.

2. The method of claim 1, wherein the communicating with the peer device is direct with the peer device.

3. The method of claim 1, wherein the communicating with the peer device is through the UE.

4. The method of claim 1, wherein the authentication information provides authentication for using the resources in the presence of the UE.

5. The method of claim 1, further comprising searching through predetermined frequency bands for the control information.

6. The method of claim 1, wherein the authentication information restricts communication to a set of devices.

7. The method of claim 1, wherein the authentication information restricts communication based on a level of the authentication.

8. An apparatus for wireless communication, comprising:
   means for receiving control information from a user equipment (UE), the control information comprising information indicating resources for peer-to-peer communication;
   means for establishing a peer-to-peer link with the UE to receive authentication information for using the resources, wherein the authentication information provides authentication for using the resources for a period of time absent the presence of the UE; and
   means for communicating with a peer device using the resources.

9. The apparatus of claim 8, wherein the communicating with the peer device is direct with the peer device.

10. The apparatus of claim 8, wherein the communicating with the peer device is through the UE.

11. The apparatus of claim 8, wherein the authentication information provides authentication for using the resources in the presence of the UE.

12. The apparatus of claim 8, further comprising means for searching through predetermined frequency bands for the control information.

13. The apparatus of claim 8, wherein the authentication information restricts communication to a set of devices.

14. The apparatus of claim 8, wherein the authentication information restricts communication based on a level of the authentication.

15. An apparatus for wireless communication, comprising:
    a processing system configured to:
    receive control information from a user equipment (UE), the control information comprising information indicating resources for peer-to-peer communication;
    establish a peer-to-peer link with the UE to receive authentication information for using the resources, wherein the authentication information provides authentication for using the resources for a period of time absent the presence of the UE; and
    communicate with a peer device using the resources.

16. The apparatus of claim 15, wherein the processing system is configured to communicate directly with the peer device.

17. The apparatus of claim 15, wherein the processing system is configured to communicate with the peer device through the UE.

18. The apparatus of claim 15, wherein the authentication information provides authentication for using the resources in the presence of the UE.

19. The apparatus of claim 15, wherein the processing system is further configured to search through predetermined frequency bands for the control information.

20. The apparatus of claim 15, wherein the authentication information restricts communication to a set of devices.

21. The apparatus of claim 15, wherein the authentication information restricts communication based on a level of the authentication.

22. A computer program product, comprising:
    a computer-readable medium comprising code for:
    receiving control information from a user equipment (UE), the control information comprising information indicating resources for peer-to-peer communication;
    establishing a peer-to-peer link with the UE to receive authentication information for using the resources, wherein the authentication information provides authentication for using the resources for a period of time absent the presence of the UE; and
    communicating with a peer device using the resources.

23. The computer program product of claim 22, wherein the communicating with the peer device is direct with the peer device.

24. The computer program product of claim 22, wherein the communicating with the peer device is through the UE.

25. The computer program product of claim 22, wherein the authentication information provides authentication for using the resources in the presence of the UE.

26. The computer program product of claim 22, the computer-readable medium further comprising code for searching through predetermined frequency bands for the control information.

27. The computer program product of claim 22, wherein the authentication information restricts communication to a set of devices.

28. The computer program product of claim 22, wherein the authentication information restricts communication based on a level of the authentication.

* * * * *